April 2, 1968 C. M. WINE 3,376,435
SYNCHRONIZING CIRCUIT EMPLOYING PLURAL BISTABLE-ELEMENTS
FOR PRODUCING LOW FREQUENCY OUTPUT IN SYNCHRONISM
WITH LOW AND HIGH FREQUENCY INPUTS
Original Filed June 1, 1962
2 Sheets-Sheet 1

INVENTOR.
CHARLES M. WINE
BY
Edward J Norton
Attorney

INVENTOR.
CHARLES M. WINE
BY
Edward J. Norton
Attorney 3,376,435

SYNCHRONIZING CIRCUIT EMPLOYING PLURAL BISTABLE-ELEMENTS FOR PRODUCING LOW FREQUENCY OUTPUT IN SYNCHRONISM WITH LOW AND HIGH FREQUENCY INPUTS

Charles M. Wine, Princeton, N.J., assignor to Radio Corporation of America, a corporation of Delaware Continuation of application Ser. No. 199,288, June 1, 1962. This application Dec. 11, 1964, Ser. No. 417,743
11 Claims. (Cl. 307—269)

Figure 1:
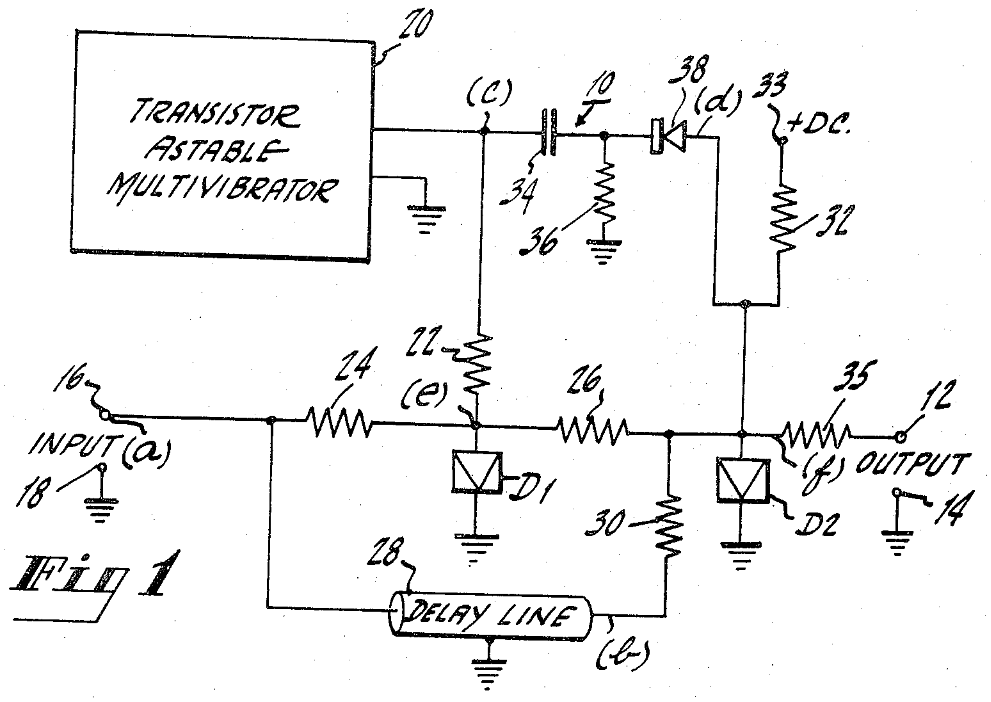

This application is a continuation of application Ser. No. 199,288, filed June 1, 1962, and now abandoned by Charles M. Wine for Synchronizing Circuit.

This invention relates generally to synchronizing circuits, and particularly to an improved circuit for producing output trigger pulses at a relatively low repetition rate and in fixed phase relationship with input signals at a relatively much higher repetition rate. The improved synchronizing circuit of the present invention is particularly useful for applying synchronized pulses to the deflection circuits of a sampling oscilloscope so that the sampled pulse is in time coincidence with a fixed point or phase on the input signal to be observed.

In order to observe high speed, repetitive signals with a sampling oscilloscope, a low frequency trigger pulse, properly synchronized with the signal to be observed, is employed. The most common means for obtaining such trigger pulses in the prior art are synchronizing circuits that count down (frequency divide) from the high frequency input signals. These prior art circuits produce trigger pulses having two distinct characteristics. Firstly, the start of each trigger pulse is fixed in time with respect to a reference point of each $n^{th}$ cycle of the high frequency input signal. Secondly, the repetition rate of the trigger pulses is an integral sub-multiple of the repetition rate of the high frequency input signal. Such count-down synchronizing circuits are relatively complex and expensive. In circuits of the present invention, the frequency of the low frequency trigger pulses is not necessarily an integral sub-multiple of the frequency of the high frequency input signals. In accordance with the present invention, the leading edge of each output, low frequency trigger pulse is, however, fixed in phase, or coincidence, with a fixed point (a definite fixed phase) on selected cycles of the high frequency input signal.

It is an object of the present invention to provide an imrpoved synchronizing circuit that is less complex than synchronizing circuits of the prior art, relatively free from time jitter, and yet highly efficient in use.

In accordance with the present invention, the improved synchronizing circuit comprises a relatively low frequency oscillator and two bistable circuits. Each of the bistable circuits has both high and low voltage stable states. The oscillator circuit and the high frequency input signals are applied to the first bistable circuit to cause it to switch from its low voltage state to its high voltage state periodically at the frequency of the oscillator circuit. The output of the first bistable circuit is applied to the second bistable circuit. The high frequency input signals are also applied to the second bistable circuit through a delay circuit. The second bistable circuit is biased so that it will switch from its low voltage state to its high voltage state only upon the application thereto of both the high voltage output from the first bistable circuit and a delayed one of the high frequency input signals. Means are also provided to reset the bistable circuits periodically at the frequency of the oscillator circuit. The output, low frequency trigger pulses, synchronized with high frequency input signals, in the sense of having a fixed phase relationship with the input pulses, are derived from the second bistable circuit.

Figure 3:
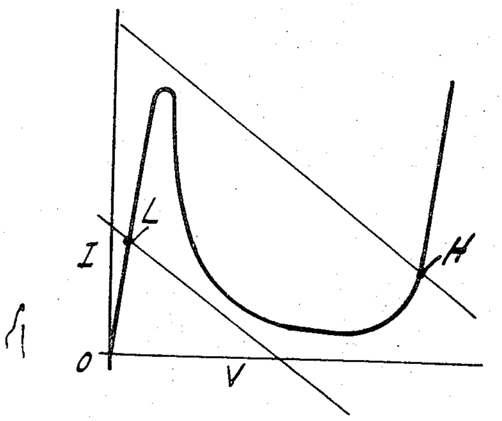
Figure 4:
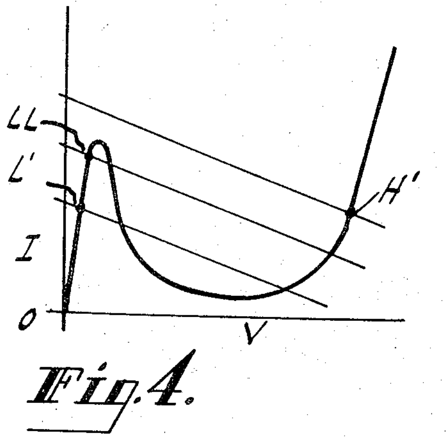
Figure 2:
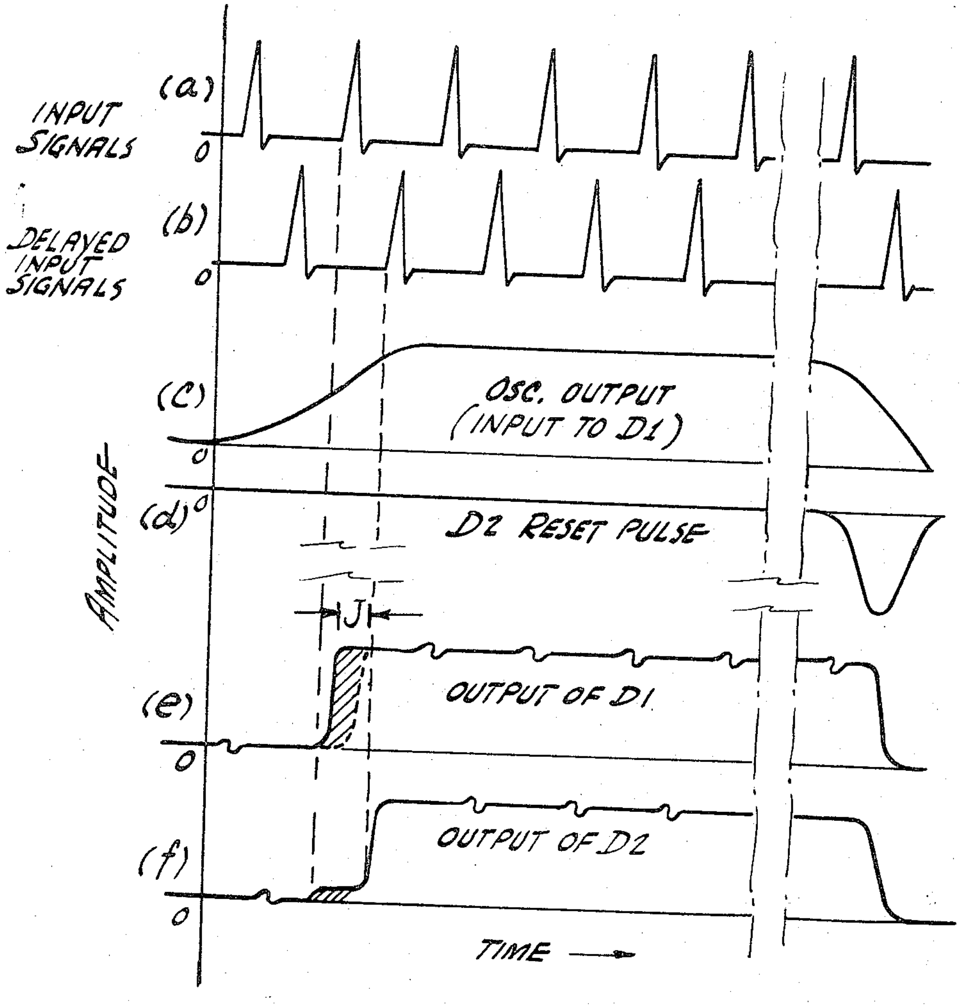

The novel features of the present invention, both as to its organization and method of operation, as well as additional objects and advantages thereof, will be more readily understood from the following description, when read in connection with the accompanying drawings, in which the same reference characters designate similar parts throughout, and in which:

FIG. 1 is a schematic diagram, partly in block form, of an improved synchronizing circuit in accordance with the present invention, FIG. 2 is a series of waveforms used to explain the operation of the synchronizing circuit in FIG. 1; and FIGS. 3 and 4 are current-voltage (I–V) characteristics of components of the synchronizing circuit shown in FIG. 1.

Referring, now, particularly to FIG. 1, there is shown a synchronizing circuit 10 for providing between its output terminals 12 and 14 relatively low frequency trigger pulses in synchronism with relatively much higher frequency signals applied to input terminals 16 and 18. The terminals 14 and 18 are connected to a common terminal, such as ground. The synchronizing circuit 10 comprises an oscillator circuit 20, such as a transistor astable multivibrator, adapted to provide oscillations of a relatively low frequency, e.g., the frequency of the trigger pulses to be provided between the output terminals 12 and 14. The oscillations of the oscillator 20 may be square waves having the waveform *c* shown in FIG. 2. Typical high frequency input signals and output trigger pulses are shown respectively by the waveforms *a* and *f*, in FIG. 2.

The synchronizing circuit 10 comprises two bistable circuits having two tunnel diodes D1 and D2, respectively. The diodes D1 and D2 are negative resistance diodes of the type having high and low voltage stable states, depending upon the amplitude of the current applied to them.

The diode D1 is connected to operate as a threshold gate circuit. To this end, the output of the oscillator 20 is connected across the diode D1 through a resistor 22. The amplitude of each positive-going pulse *c* (FIG. 2) of the oscillator 20 is sufficient to switch the diode D1 from its low voltage state to its high voltage state. The high frequency input signals *a* (FIG. 2), applied between the input terminals 16 and 18 of the circuit 10, are also applied across the diode D1 through a resistor 24. It will now be understood that although the periodic pulses from the oscillator 20 alone are adapted to switch the diode D1 from its low voltage state to its high voltage stable state at the frequency of the oscillator 20, the high frequency input signals *a* aid in the switching action of the diode D1 by adding to the amplitude of the pulses from the oscillator 20.

The diode D2 is connected to function as an "AND" gate. To this end, the output from the diode D1 is connected across the diode D2 through a resistor 26. The high frequency input signals *a*, applied between the input terminals 16 and 18, are also applied across the diode D2 through a delay circuit, such as the delay line 28 connected in series with a resistor 30. The delay line 28 is shielded and grounded. The diode D2 is biased in its low voltage state by means of a source of unidirectional voltage (not shown) applied across the diode D2 through a resistor 32. The positive terminal of the unidirectional voltage source is connected to a terminal 33. The output of the diode D2 is applied to the output terminals 12 and 14 through a resistor 35. The output from the diode D1, even in its high voltage state, is insufficient to switch the diode D2 to its high voltage state in the absence of the application of a delayed, input high frequency signal also across diode D2. It will be understood, therefore, that an output trigger pulse *f* from the diode D2 can be obtained only by the application thereto of both a voltage *e* from the diode D1 when the latter is in its high voltage state and a delayed, high frequency input signal *b*.

Means are provided to return the diodes D1 and D2 to their low voltage states periodically after they have been switched to their high voltage states. The diode D1 is returned to its low voltage state periodically when each pulse from the oscillator 20 reaches zero. Since the anode of the diode D2 is biased positively with a steady bias, the pulses *c* from the oscillator 20 are differentiated and clipped, and the resulting, negative-going pulses are applied periodically to the anode of the diode D2 to switch it to its low voltage state. To this end, the output of the oscillator 20 is connected across a capacitor 34 in series with a resistor 36 to differentiate the output pulses of the oscillator 20. The differentiated pulses are clipped by a diode 38 connected from the common junction of the capacitor 34 and the resistor 36 to the anode of the diode D2. The diode 38 is poled so as to apply only negative-going pulses *d* (FIG. 2) periodically to the diode D2.

Referring, now, to FIGS. 3 and 4, there are shown the I–V characteristics of the diodes D1 and D2, respectively. In FIG. 3, the low and high voltage steady states of the diode D1 are indicated respectively by the points L and H, the points of intersection between the I–V characteristic curve and the two load lines representing the low and high output voltage limits of the oscillator circuit 20.

In FIG. 4, the point L′ represents a low voltage steady state of the diode D2. The point LL is substantially equal to the point L′ in voltage and also represents the low voltage steady state of the diode D2. The voltage L′ is the voltage across the diode D2 supplied by the biasing voltage from the steady, bias voltage source, and the voltage LL represents the voltage across the diode D2 upon the application thereto of only the output from the diode D1 when the latter is high. The voltage point H′ represents the voltage across the diode D2 in its high voltage steady state, occurring upon the application thereto of both a delayed input signal and the high voltage output from the diode D1.

The waveforms *a* . . . *f* in FIG. 2 represent the voltages occurring at the points *a* . . . *f* in the circuit 10 in FIG. 1, but the amplitudes of these waveforms are not to scale.

The operation of the synchronizing circuit 10 will now be explained. Let it be assumed that the frequency of the repetitive input signals *a*, applied between the input terminals 16 and 18, is 500 megacycles per second. Let it also be assumed that about every millionth signal is sampled, whereby to produce output trigger pulses at a relatively lower repetition rate, say, about 500 cycles per second, for example, between the output terminals 12 and 14. Thus, the frequency of the output trigger pulses *f* is reduced with respect to the frequency of the input signals *a* by about $10^6$. The oscillator 20 is adjusted, by any means well known in the art, to produce pulses *c* of the desired low frequency trigger pulses, namely, about 500 c.p.s. Pulses *c* from the oscillator 20 cause the diode D1 to be switched periodically between its low and its high voltage states at this low frequency. The pulses *e* produced at the output of the diode D1 have a small amount of time jitter J, as shown by the shaded area of the waveform *e* in FIG. 2. The amount of time jitter is a function of the amplitude of overdrive applied to the diode D1. Since the diode D1 is switched from its low voltage, steady state to its high voltage, steady state either by a pulse *c* from the oscillator 20 or by the combination of the pulse *c* and the input signal *a*, the amplitude of the overdrive may vary each time the diode D1 is switched; hence, the jitter J. The amount of delay produced by the delay line 28 is at least as long as the maximum jitter J, but it is less than one cycle of the high frequency input signal *a*. The high voltage output from the diode D1 and the delayed input pulse *b* are applied across the diode D2 to switch the latter from its low voltage state L′, LL to its high voltage state H′ to provide the output trigger pulses *f*. The output trigger pulses *f* may be amplified, if necessary. The jitter is absent in the leading edge of these output pulses. These leading edges occur in fixed phase relation to the high frequency input pulses. Hence there is substantially no jitter on the oscilloscope if the oscilloscope is synchronized with the leading edge of the output pulses of the diode D2.

The diode D1 is returned to its low voltage state L periodically every time the oscillator pulses *c* drop to zero, and the diode D2 is returned to its low voltage state L′ periodically by the differentiated and clipped pulses *d*, shown in FIG. 2.

It is noted that the diode D2 is switched periodically to its high voltage state with substantially no jitter because it is always switched with the combined, relatively large, constant amplitudes of high voltage output pulses *e* from the diode D1 and the delayed input signal *b*. Thus, the leading edges of the output trigger pulses *f* of diode D2 are always initiated in fixed phase relationship with the delayed input signal *b*, and the delayed, high frequency input signals *b* may be sampled by a sampling oscilloscope when the horizontal sweep circuit of the sampling oscilloscope is triggered by the relatively low frequency trigger pulses *f*. For example, the output pulses from D2 may be initiated at the $n^{th}$ input signal, the $2n+1^{st}$ input signal, and perhaps the $3n-1^{st}$ input signal. Nevertheless, the desired, jitter-free, initiation of the output pulses in fixed phase relationship to the input signals is preserved.

From the foregoing description, it will be apparent that there has been provided an improved synchronizing circuit adapted to provide relatively low frequency trigger pulses for observing repetitive, relatively high frequency signals with the aid of a sampling oscilloscope. The circuit may be incorporated in the oscilloscope. While only one embodiment and application of the invention has been described, various components useful therein, as well as variations in the circuitry coming within the spirit of this invention, will, no doubt, readily suggest themselves to those skilled in the art. Hence, it is desired that the foregoing shall be considered merely as illustrative and not in a limiting sense.

What is claimed is:

1. A synchronizing circuit for producing output pulses at a relatively low repetition rate in synchronism with input signals at a relatively higher repetition rate, said synchronizing circuit comprising, an oscillator circuit providing pulses of the frequency of said low repetition rate, two tunnel diodes each having high and low voltage stable states, means connecting said oscillator circuit to one of said diodes to switch it periodically from its low voltage state to its high voltage state, means connecting said one diode to the other of said diodes to apply the output of said one diode to said other diode, a delay circuit, means to apply said input signals to said one diode, means to apply said input signals to said other diode through said delay circuit to switch said other diode from its low voltage state to its high voltage state only upon application thereto of both a delayed one of said input signals and said output from said one diode when said one diode is in its high voltage state, said delay circuit delaying said input signal an amount less than one cycle of said input signal at said higher repetition rate, and means to derive said output pulses from said other diode.

2. A synchronizing circuit for producing output pulses at a relatively low repetition rate in synchronism with input pulses at a relatively higher repetition rate, said synchronizing circuit comprising, an oscillator circuit providing pulses of the frequency of said low repetition rate, a threshold circuit and an "AND" circuit each comprising a tunnel diode having high and low voltage stable states, means connecting said oscillator circuit to said threshold circuit to switch said threshold circuit periodically from its low voltage state to its high voltage state, means connecting said threshold circuit to said "AND" circuit to apply the output of said threshold circuit to said "AND" circuit, a delay circuit, means to apply said input signals to said threshold circuit, means to apply said input signals to said "AND" circuit through said delay circuit, means to bias said "AND" circuit so that it is switched from its low voltage state to its high voltage state only upon the application thereto of both a delayed one of said input signals and said output from said threshold circuit, means connecting said oscillator circuit to said "AND" circuit to switch it periodically from said high voltage state to said low voltage state, and means to derive said output pulses from said "AND" circuit.

3. A circuit for synchronizing output pulses of a relatively low frequency with repetitive input signals of a relatively higher frequency, said circuit comprising, an oscillator circuit providing pulses of said low frequency, first and second tunnel diodes each having high and low voltage stable states, means to apply said input signals and pulses from said oscillator to said first diode, each of said pulses from said oscillator being of a sufficient amplitude to switch said first tunnel diode from its low voltage state to its high voltage state, means to connect the output of said first tunnel diode to said second tunnel diode, a delay line, means to connect said input signals to said second tunnel diode through said delay line, means to bias said second tunnel diode so that it is switched from its low voltage state to its high voltage state only upon the application thereto of both a delayed one of said input signals and said output of said first tunnel diode when said first tunnel diode is in a high voltage state, said delay circuit delaying said input signals an amount less than one cycle of said input signal at said higher frequency, and means to derive said output pulses from said second diode.

4. A circuit for synchronizing relatively low frequency output pulses with relatively higher frequency input signals, said circuit comprising, an oscillator providing pulses of the frequency of said low frequency output pulses, first and second tunnel diodes each having high and low voltage stable states, means to apply said oscillator pulses and said input signals across said first diode to switch said first diode periodically between its low and high voltage states, means to connect the output of said first diode across said second diode, a delay line, means to connect said input signals across said second diode through said delay line, means to bias said second diode so as to cause it to switch from said low voltage state to said high voltage state only upon the application thereto of both said output of said first diode and a delayed one of said input signals, means connected between said oscillator and said second diode to switch said second diode periodically from its high voltage state to its low voltage state, and means to derive said output pulses across said second diode.

5. A circuit for synchronizing relatively low frequency output pulses with relatively higher frequency input signals, said circuit comprising, an oscillator providing pulses of the frequency of said low frequency output pulses, first and second tunnel diodes each having high and low voltage stable states, means to apply said oscillator pulses and said input signals across said first diode to switch said first diode periodically between its low and high voltage states, means to connect the output of said first diode across said second diode, a delay line, means to connect said input signals across said second diode through said delay line, means to bias said second diode so as to cause it to switch from said low voltage state to said high voltage state only upon the application thereto of both said output of said first diode and a delayed one of said input signals, means to differentiate said oscillator pulses to obtain differentiated pulses, means to clip said differentiated pulses to obtain clipped pulses, means to apply said clipped pulses periodically across said second diode to cause it to switch periodically from its high voltage state to its low voltage state, and means to obtain said output pulses across said second diode.

6. In combination, a threshold circuit and a bistable device each having a set and reset condition, both quiescently in said reset condition, means for applying first pulses at a relatively low repetition rate and of relatively long duration, and second pulses at a relatively high repetition rate and of relatively short duration, and of the same polarity as said first pulses, to said threshold circuit for periodically switching said threshold circuit to its set condition, means for delaying said second pulses an interval not integrally related to that between said second pulses, and means for applying said delayed second pulses and the output of said threshold circuit, both in the same polarity, to said bistable device for switching said bistable device to its set condition in response to the receipt by said bistable device of said delayed second pulses during the intervals said threshold circuit is in its set condition.

7. In combination, a threshold circuit and a bistable device each having a set and reset condition, both quiescently in said reset condition, means for applying first pulses at a relatively low repetition rate and of relatively long duration, and second pulses at a relatively high repetition rate and of relatively short duration, and of the same polarity as said first pulses, to said threshold circuit with said first and second pulses being at an amplitude level such that either pulses periodically switch said threshold circuit to its set condition, means for delaying said second pulses an interval somewhat less than that between said second pulses, and means for applying said delayed second pulses and the output of said threshold circuit, both in the same polarity, to said bistable device for switching said bistable device to its set condition in response to the receipt by said bistable device of said delayed second pulses during the intervals said threshold circuit is in its set condition.

8. In combination, a threshold circuit and a bistable device each having a set and reset condition, both quiescently in said reset condition, means for applying first pulses at a relatively low repetition rate and of relatively long duration, and second pulses at a relatively high repetition rate and of relatively short duration, and of the same polarity as said first pulses, to said threshold circuit, both at an amplitude level such that either pulses switch said threshold circuit to its set condition for an interval determined by the duration of said pulses, means for delaying said second pulses an interval somewhat less than that between said second pulses, means for applying said delayed second pulses and the output of said threshold circuit, both in the same polarity, to said bistable device for switching said bistable device to its set condition in response to the receipt by said bistable device of said delayed second pulses during the intervals said threshold circuit is in its set condition, and means responsive to the lagging edge of said first pulses for resetting said bistable device to its original reset condition.

9. In combination, two tunnel diodes capable of assuming either one of a first and second voltage state, both quiescently biased to said first voltage state, means for applying first pulses at a relatively low repetition rate and a relatively long duration, and second pulses at a relatively high repetition rate and a relatively short duration, and of the same polarity as the first pulses to said first tunnel diode for periodically switching the same to its said second voltage state, means for delaying said second pulses an interval somewhat less than the interval between said second pulses, and means for applying said delayed second pulses and the output of the first tunnel diode in the same polarity to said second tunnel diode for switching said second tunnel diode to its said second voltage state in response to the receipt by said second tunnel diode of a delayed one of said second pulses during the interval said first tunnel diode is in its said second voltage state.

10. In combination, two tunnel diodes, the first quiescently monostably biased to a given voltage state and the second quiescently bistably biased to the same voltage state, means for applying first pulses at a relatively low repetition rate and a relatively long duration, and second pulses at a relatively high repetition rate and a relatively short duration, and of the same polarity as the first pulses to said first tunnel diode, either pulses being of sufficient amplitude to switch said second tunnel diode to its other voltage state, means for delaying said second pulses an interval somewhat less than the interval between said second pulses, and means for applying said delayed second pulses and the output of the first tunnel diode in the same polarity to said second tunnel diode for switching said second tunnel diode to its other voltage state in response to the receipt by said second tunnel diode of a delayed second pulse during the interval said first tunnel diode is in its said other voltage state.

11. In combination, two tunnel diodes, the first quiescently monostably biased to a given voltage state and the second quiescently bistably biased to the same voltage state, means for applying first pulses at a relatively low repetition rate and a relatively long duration, and second pulses at a relatively high repetition rate and of relatively short duration, and of the same polarity as the first pulses, to said first tunnel diode for periodically switching the same to its other voltage state, means for delaying said second pulses an interval somewhat less than the interval between said second pulses, means for applying said delayed second pulses and the output of said first tunnel diode in the same polarity to said second tunnel diode for switching said second tunnel diode to its other voltage state in response to the receipt by said second tunnel diode of a delayed one of said second pulses during the interval said first tunnel diode is in its said other voltage state, and means responsive to the lagging edge of said first pulses for switching said second tunnel diode from its said other voltage state to its original voltage state.

References Cited

UNITED STATES PATENTS

| | | | |
|---|---|---|---|
| 2,512,152 | 6/1950 | Haworth et al. | 328—55 |
| 3,099,712 | 7/1963 | Meacham | 328—72 X |
| 3,188,484 | 6/1965 | Jorgensen | 307—88.5 |
| 3,196,358 | 7/1965 | Bagley | 307—88.5 |

JOHN S. HEYMAN, *Primary Examiner.*